United States Patent
Wang et al.

(10) Patent No.: US 12,400,386 B2
(45) Date of Patent: Aug. 26, 2025

(54) GENERATING ANIMATED VIDEOS BASED ON LINGUISTIC INPUTS

(71) Applicant: INTERNATIONAL BUSINESS MACHINES CORPORATION, Armonk, NY (US)

(72) Inventors: Hua Hong Wang, Shanghai (CN); Mo Han Bai, Shanghai (CN); Shuai Cao, Shanghai (CN); Li Wang, Shanghai (CN); Liyuan Pan, Shanghai (CN); Wen Ting Li, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 18/164,716

(22) Filed: Feb. 6, 2023

(65) Prior Publication Data

US 2024/0265604 A1   Aug. 8, 2024

(51) Int. Cl.
G06T 13/20     (2011.01)
G06F 40/205   (2020.01)

(52) U.S. Cl.
CPC ............ *G06T 13/20* (2013.01); *G06F 40/205* (2020.01)

(58) Field of Classification Search
CPC .............................. G06T 13/20; G06F 40/205
See application file for complete search history.

(56) References Cited

U.S. PATENT DOCUMENTS

| | | | |
|---|---|---|---|
| 2017/0098324 A1 | 4/2017 | Srinivasan | |
| 2017/0200081 A1* | 7/2017 | Allen | G06F 40/205 |
| 2018/0137424 A1* | 5/2018 | Gabaldon Royval | G06N 5/022 |
| 2018/0260385 A1* | 9/2018 | Fan | G06F 40/274 |
| 2019/0205474 A1* | 7/2019 | Pawar | G06F 40/205 |
| 2019/0304157 A1* | 10/2019 | Amer | G06V 40/23 |
| 2020/0051302 A1* | 2/2020 | Subramonyam | G11B 27/34 |
| 2020/0126126 A1* | 4/2020 | Briancon | G06N 20/20 |
| 2020/0218503 A1* | 7/2020 | Mailey | G06F 40/58 |
| 2021/0158844 A1 | 5/2021 | Hirtzel | |
| 2021/0350064 A1* | 11/2021 | Freundlich | G06F 21/6227 |

OTHER PUBLICATIONS

Chi, et al., "Automatic Instructional Video Creation from a Markdown-Formatted Tutorial," In The 34th Annual ACM Symposium on User Interface Software and Technology (UIST '21), Oct. 10-14, 2021, Virtual Event, USA, ACM, New York, NY USA, 14 pgs., <https://doi.org/10.1145/3472749.3474778>.

YouTube, "Text to Video—A.I. Assisted Video Creation, Product Demo," YouTube.com, Raw Shorts, Jul. 30, 2018, [accessed Oct. 27, 2022], 3 pgs., Retrieved from the Internet: <https://www.youtube.com/watch?v=DsjlcNzsjbQ>.

Toiny W. "Convert Text to Video with AI", retrieved from web https://web.archive.org/web/20230609151005/https://wave.video/tools/video-marketing/turn-text-into-video, Jun. 9, 2023, 2 pages.

* cited by examiner

*Primary Examiner* — Michael Le
(74) *Attorney, Agent, or Firm* — Andre Adkins

(57) ABSTRACT

Techniques are described with respect to a system, method, and computer product for generating multi-media content based on linguistics. An associated method includes receiving a plurality of linguistic inputs and analyzing the plurality of linguistic inputs. The method further including generating multi-media content for presentation to a user based on the analyzing of the linguistic inputs.

20 Claims, 5 Drawing Sheets

GENERATING ANIMATED VIDEOS BASED ON LINGUISTIC INPUTS

BACKGROUND

This disclosure relates generally to the field of linguistics, and more particularly to generating animated videos based on analyses of linguistic inputs.

Multi-media content (e.g., videos, music, etc.) has become the most engaging form of content to inform and educate audiences. Although the presentation of multi-media content is typically straightforward, the generation of multi-media content is significantly more difficult due to the necessary knowledge of the user regarding multi-media content generation tools and platforms. In particular, the process of modeling, editing, and rendering an animation requires specific technical knowledge and skills pertaining to each of the aforementioned steps. In addition to the aforementioned process, users may also desire to generate customizable multi-media content in order for it to reflect personal preferences along with visual effects that are likely to enhance the quality of the multi-media content.

SUMMARY

Additional aspects and/or advantages will be set forth in part in the description which follows and, in part, will be apparent from the description, or may be learned by practice of the invention.

A system, method, and computer product for generating multi-media content based on linguistics is disclosed herein. In some embodiments, the computer-implemented method for generating multi-media content based on linguistics includes receiving a plurality of linguistic inputs; analyzing the plurality of linguistic inputs; and generating multi-media content for presentation to a user based on the analyzing of the linguistic inputs.

According to an embodiment of the present disclosure, a multi-media content generation system includes a multi-media content generation controller including one or more processors and a computer-readable storage medium coupled to the one or more processors storing program instructions, the controller being configured to generate user customized animations and previews of the user customized animations that are displayed on a centralized platform. The centralized platform further configured to support receiving user inputs allowing the multi-media content generation system to provide multi-media content customization features to users operating on computing devices, said multi-media content customization features including, but not limited to stylistic preference options, video editing features, text element insertion tools, filtering mechanisms, etc.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
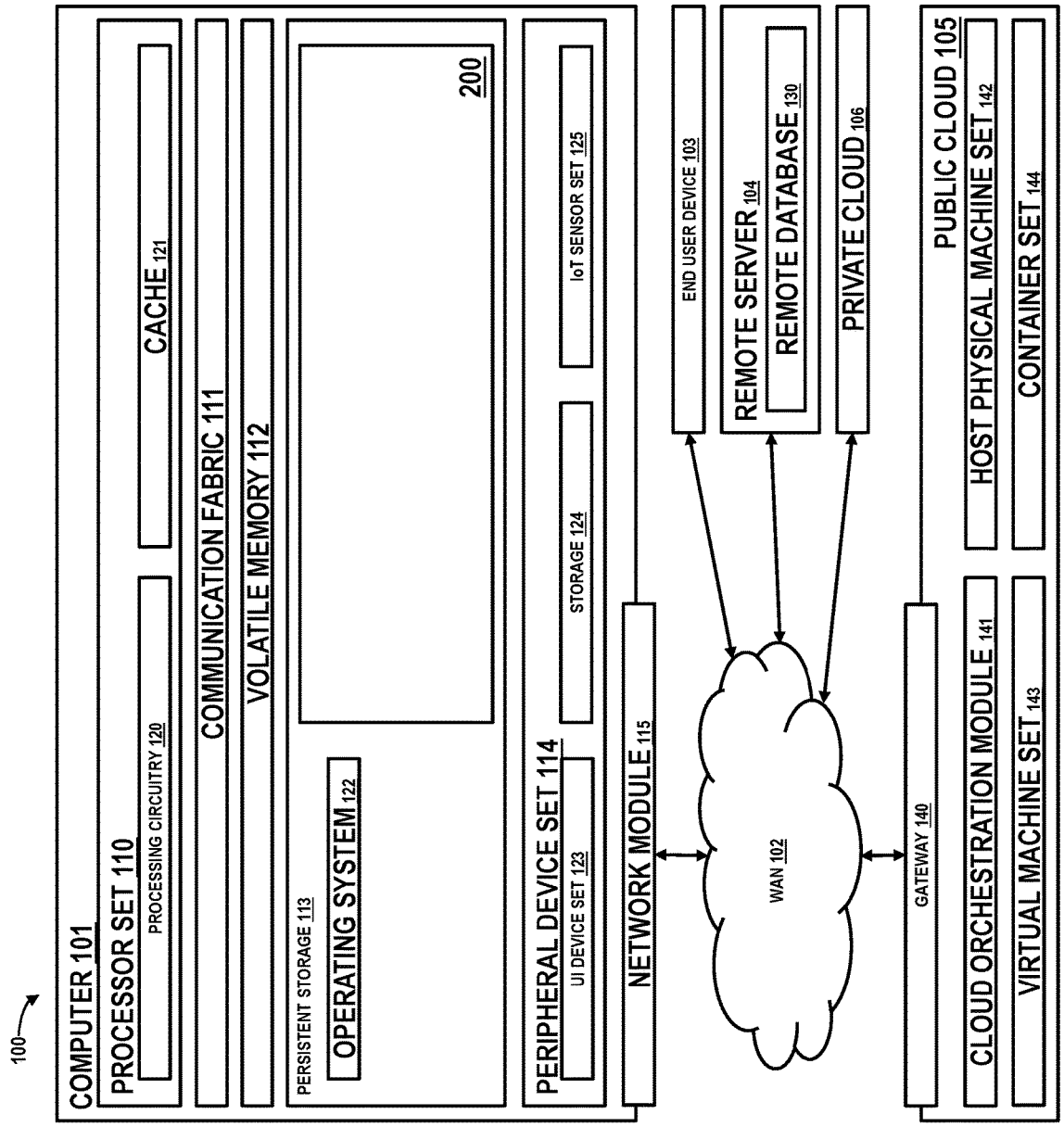
FIG. 1 illustrates a networked computer environment, according to an exemplary embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

As used herein, the term "multi-media content" includes text, graphics, video, animation, audio, and/or any combination thereof known to those of ordinary skill in the art. As used herein, the term "linguistic input" includes a sequence of text, characters, speech acoustics (e.g., pronunciation, intonation, tone, etc.), message (e.g., email, instant message, direct message, text message, social media post, utterance, etc.), or any other applicable type of input known to those of ordinary skill in the art. As used herein, the term "instances" refers to a derivative of a linguistic input and/or multi-media content associated with a linguistic input that may be embodied via video fragments, textual elements, linguistic features, etc.

The following described exemplary embodiments provide a method, computer system, and computer program product for generating multi-media content based on linguistics. Massive volumes of multi-media content are generated every minute. However, the creation of multi-media content is a process that can be daunting to users without technical knowledge and skills due to not only the quantity of platforms available to generate and customize multi-media content each of which may include unique tools and features, but also the specialized knowledge and skills that are needed to customize multi-media content in accordance with the desires and preferences of the users. For example, modeling, rigging, and rendering skills are necessary in order for users to generate vivid animations. In addition, processing of linguistics can optimize multi-media content generation due to the fact that data derived from analyses of linguistic inputs such as, but not limited to, identified keywords, ideas, contexts, metadata, etc. may be ascertained. This data can be utilized for multiple purposes including searching repositories of multi-media content for content related to the identified keywords, ideas, contexts, metadata, etc. Therefore, the present embodiments have the capacity to provide a system not only configured to generate multi-media content in a manner that includes a plurality of built-in features and resources for customization, but also dynamically generates multi-media content using attributes mapped to identified keywords, ideas, contexts, metadata, etc. derived from linguistic inputs. Thus, the present embodiments optimize multi-media content for users without requiring specialized technical knowledge or skills.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch payment devices or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and computer program product for generating multi-media content based on linguistics. Referring now to FIG. 1, a computing environment 100 contains an example of an environment for the execution of at least some of the computer code involved in performing the inventive methods, such as linguistics-based multi-media content generation system 200. Computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 422 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) payment device), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD payment device. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter payment device or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
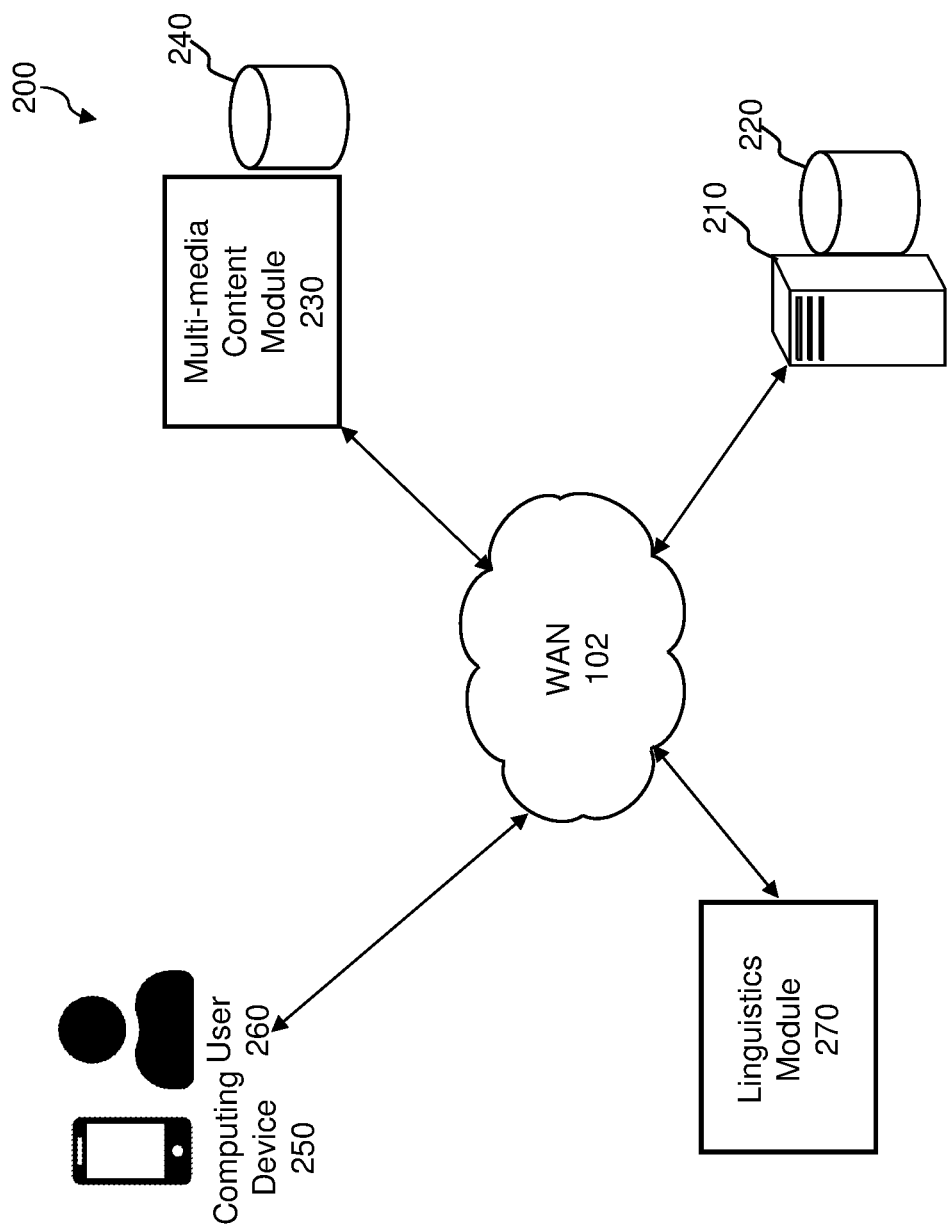
FIG. 2 illustrates a linguistics-based multi-media content generation system environment, according to an exemplary embodiment.

Referring now to FIG. 2, a functional block diagram of a networked computer environment illustrating a linguistics-based multi-media content generation system 200 (hereinafter "system") comprising a server 210 communicatively coupled to a database 220, a multi-media content module 230 comprising a multi-media content repository 240, a computing device 250 associated with a user 260, and a linguistics module 270 each of which are communicatively coupled over WAN 102 (hereinafter "network") and data from the components of system 200 transmitted across the network is stored in database 220.

In some embodiments, server 210 is configured to operate a centralized platform configured for user 260 to access via computing device 250 and/or and other applicable computing devices. In a preferred embodiment, the centralized platform is a multi-media content generation application providing interfaces between user 260 and multi-media content module 230, in which the centralized platform is designed to run on computing device 250 allowing user 260 to send data, input data, collect/receive data, etc. It should be noted that multi-media content module 230 comprises a plurality of features and tools described throughout that allow user 260 to create, customize, and optimize multi-media content in addition to previews of multi-media content which function as one or more subsets of multi-media content. In some embodiment, multi-media content repository 240 is a database comprising components including but not limited to textual data, metadata, videos, photos, etc. derived from sources such as social media platforms, video hosting/sharing sites, video platforms, or any other applicable source of multi-media content. For example, multi-media content repository 240 may include multi-media content derived from linguistics module 270 performing natural language processing (e.g., sentence splitting, tokenization, entity extracting, part-of-speech tagging, dependency parsing, chunking, anaphora resolution, etc.) on linguistic inputs and/or data collected by server 210 from internet-based sources via web crawlers, etc. For example, semantics of social network posts associated with user 260 are processed and tokenized in order to ascertain individual words, phrases, interests, sentiments, etc. Additionally, multi-media content repository 240 may store a plurality of instances derived from the aforementioned techniques performed by linguistics module 270 on the linguistic inputs, in which the instances are linguistic features, video fragments, textual elements of the linguistic inputs which may be used as the basis to search for relevant attributes derived from the analyses of the linguistic inputs, wherein the attributes are designed to be integrated into a multi-media content generation customization process. Furthermore, the instances may be derived from not only the linguistic inputs, but also textual data, metadata, videos, photos, etc. within multi-media content repository 240, in which multi-media content repository 240 is continuously being updated with instances derived from analyses performed by linguistics module 270.

Computing device 250 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database.

Linguistics module 270 is designed to perform various tasks on linguistic inputs such as but not limited to parsing, tokenization, analyzing (e.g., semantic-based, context-based, etc.), or any other applicable or any other task/feature of linguistics, computer science, and artificial intelligence for processing natural language data. For example, linguistics module 270 is designed to receive linguistic inputs, such as a detected conversational utterance of user 260, and utilize natural language processing (NLP) techniques, term frequency-inverse document frequency (tf-idf) techniques, and corpus linguistic analysis techniques (e.g., syntactic analysis, etc.) to identify keywords, parts of speech, and syntactic relations within the linguistic inputs, said corpus linguistic analysis techniques including, but not limited to part-of-speech tagging, statistical evaluations, optimization of rule-bases, and knowledge discovery methods, to parse, identify, analyze linguistic inputs. Outputs of techniques performed by linguistics module 270 may be stored in database 220 allowing multi-media content module 230 to perform functions such as mapping of metadata derived from instances of the linguistic inputs to attributes of the multi-media content within multi-media content repository 240. In some embodiments, linguistics module 270 may perform featuring scaling techniques (e.g., rescaling, mean normalization, etc.) and word embedding techniques to vectorize and normalize feature sets.

Figure 3:
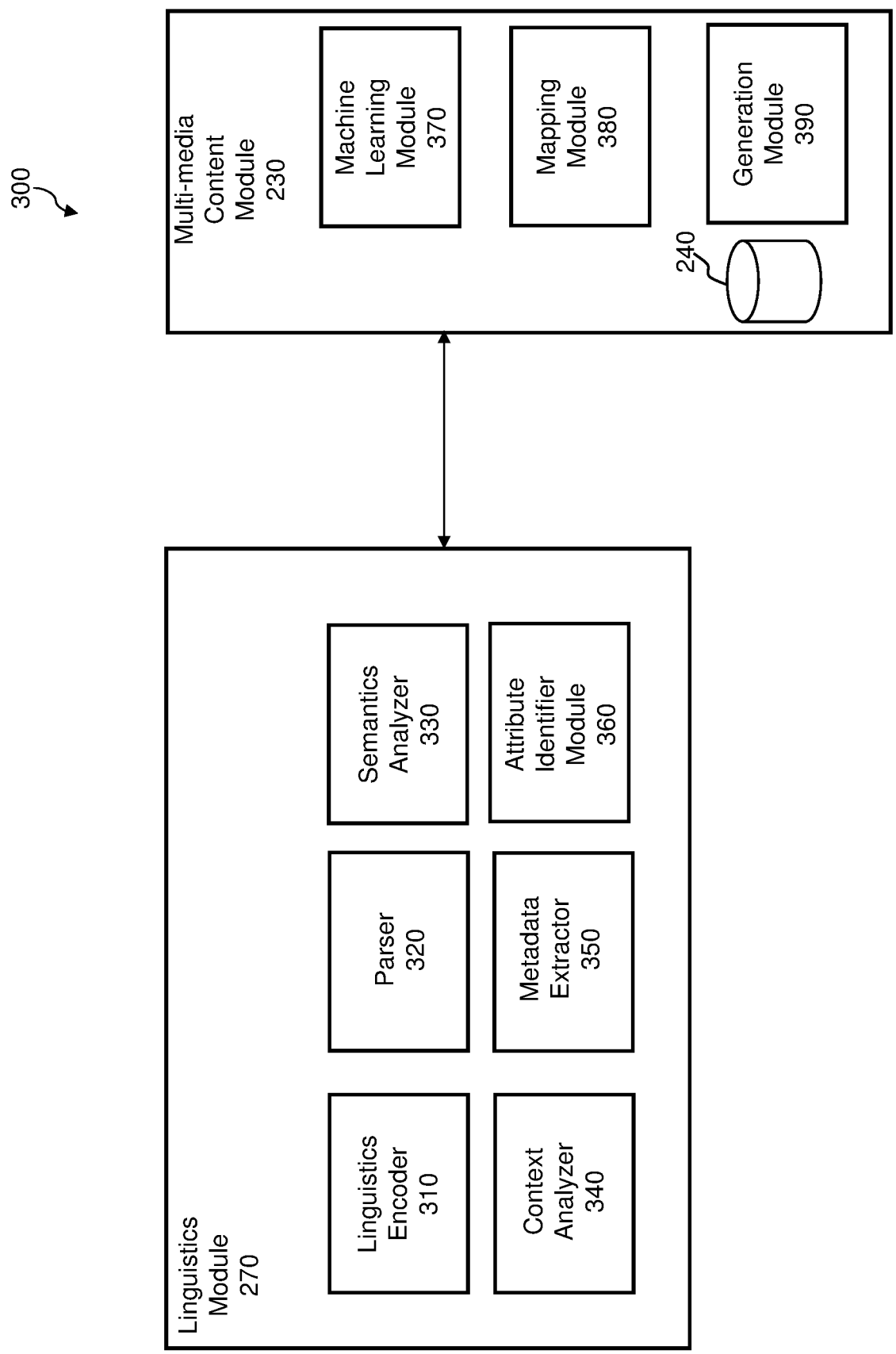
FIG. 3 illustrates a block diagram of various modules associated with the linguistics-based multi-media content generation system of FIG. 2, according to an exemplary embodiment.

Referring now to FIG. 3, an example architecture 300 of multi-media content module 230 and linguistics module 270 is depicted, according to an exemplary embodiment. In some embodiment, linguistics module 270 comprises a linguistics encoder 310, a parser 320, a semantics analyzer 330, a context analyzer 340, a metadata extractor 350, and an attribute identifier module 360. In some embodiment, a multi-media content module 230 comprises a machine learning module 370, a mapping module 380, and a generation module 390, in which multi-media content module 230 is communicatively coupled to linguistics module 270 allowing one or more components and/or outputs of analyses performed by linguistics module 270 to be received and processed machine learning module 370, mapping module 380, and generation module 390. Mappings, multi-media content historically generated, and multi-media content generated based on outputs of the aforementioned modules are stored multi-media content repository 240.

In some embodiments, linguistics encoder 310 may comprise a plurality of configurations subject to the overall setup of linguistics module 270. For example, linguistics encoder 310 may include a linear embedding layer, followed by one-dimensional convolutional layers, and a long short-term memory (LSTM) layer or any other applicable configuration. Outputs of linguistics encoder 310 may be a sequence of embedding vectors or any other applicable outputs known to those of ordinary skill in the art.

Parser 320 is tasked with parsing the linguistic inputs and any other applicable content which results in the plurality of instances of the linguistic inputs. For example, parsing of linguistic inputs and/or multi-media content results in the removal of redundant portions and/or frames of linguistic inputs and multi-media content in which said portions and frames may be labeled/identified as relevant to user 260 based on data including but not limited to identified keywords (e.g., detected words within statements of user 260), detected topics of relevance ascertained from analyses of social media content and other relevant sources associated with user 260, attributes of multi-media content previously generated by user 260 and/or multi-media content module 230. Parser 320 may communicate with machine learning module 370 to transmit neural word embeddings as inputs into machine learning models operated by machine learning module 370 based on the LSTM in order to identify long range dependencies between parsed keywords. It should be noted that parsing of the linguistic inputs may include detecting tokens within the linguistic inputs and results in the ascertaining of action statements and corresponding elements within the linguistic inputs; however, a major purpose of the parsing is to not only assist with extracting the instances in order to ascertain elements of linguistic inputs, but also to tailor identification of multi-media content and attributes thereof that user 260 wishes to include in their multi-media content associated with the linguistic inputs for presentation. In addition, parser 320 may detect location, sentiments, etc. from the linguistic inputs.

Semantics analyzer 330 is designed to perform identification of topics and functional dependencies within the linguistic inputs via various models, such as but not limited to a latent Dirichlet allocation (LDA) topic model, naïve bayes unigram model, a maximum entropy model, a latent semantic model or any other such technique that is known in the art or developed in the future. Semantics analyzer 330 is further configured to support usage of bigrams, trigrams, or more generally, n-grams (number=n) for linguistic input analysis. Semantics analyzer 330 may also model the linguistic inputs based on inputs of user 260 on the centralized platform or server 210 (e.g., ascertaining relevant data via crawlers) indicting topics based on multi-nominal distributions of the Dirichlet distribution of terms in the linguistic inputs. Semantics analyzer 330 may also support generation of knowledge graphs and ontology maps for processing by multi-media content module 230. For example, upon linguistics module 270 receiving linguistic inputs that include user 260 uttering "Little Red Riding Hood is one of my favorite stories", semantics analyzer 330 may utilize knowledge graphs and ontology maps to ascertain instances from the utterance such as "fairy tale", "grandmother", "wolf", etc. In addition, semantics analyzer 330 communicates with mapping module 380 in order for identified instances to be mapped to metadata, attributes, multi-media content, etc. stored in multi-media content repository 240. In some embodiments, parser 320 may also parse received digital video content, metadata, etc. from applicable sources (e.g., server 210, multi-media content module 230, uploads provided to computing device 250) for descriptors, content tokens, etc. based on semantics features provided by semantics analyzer 330 and/or inputs derived from server 210 and user 260. The parsed digital video content may be allocated in subsets (e.g., removal of redundant frames, prioritization of relevant/important frames, etc.) based on scene detection techniques and cognitive analysis supported by machine learning module 370.

Context analyzer 340 is designed to establish contexts and contextual nuances among the plurality of instances derived from the linguistic inputs. It should be noted that contexts may be established in a variety of manners including, but not limited to user-specific data associated with user 260 (e.g., time of day user 260 is utilizing computing device 250, internet browsing activity, previously selected/frequently used attributes of multi-media content module 230, biological data of user 260 acquired by the applicable computing device, etc.). For example, context analyzer 340 may ascertain that user 260 is hungry based on the linguistic inputs indicating that user 260 has uttered various food items across a short period of time. Said information including applicable ascertained terms (e.g., restaurants, recipes, etc.) are transmitted to multi-media content module 230 for the purpose of querying multi-media content repository 240 for relevant attributes designed to be utilized in multi-media content created by generation module 390. In some embodiments, context analyzer 340 receives context from server 210 or an applicable crawled third-party source (e.g., user profiles, social media platforms, content generation platforms, etc.).

Metadata extractor 350 is configured to extract metadata from the instances and also user inputs on computing device 250 while applying tagging techniques designed to indicate various features of an attribute of an instance based on semantics analyzer 330 identifying the instance attribute (e.g., subject, verb, object, attributive, adverbial, complement, scene, characters, etc.). Examples of metadata may include, but are not limited to name, type, keyword, width, height, color, contributor, or any other applicable type of metadata known to those of ordinary skill in the art. Considering the following linguistic input: "Little Red Riding Hood was a little girl. One day, she went to give her grandmother a cake. The grandmother was not at home. The big wolf was stealing something to eat in the house. Hearing the knock at the door, the big wolf quickly put on the grandmother's clothes and lay on the grandmother's bed. 'Grandma, why are your ears so big?' 'My ears are big so that I can hear what you say.'

Semantics analyzer 330 and context analyzer 340 process the linguistic input resulting in semantics analyzer 330 identifying the instance scene attribute in which metadata extractor 350 generates Table 1:

TABLE 1

| Scene | Character | Dialogue | Action | Sound |
|---|---|---|---|---|
| Home/House | Little Red Riding Hood | "Grandma, why are your ears so big?" | Speaking | (NULL) |
| Inside | Wolf | "My ears are big so that I can hear what you say." | Eating/ Putting on Clothes/ Lay on Bed | (NULL) |
| Outside | Little Red Riding Hood | (NULL) | Delivering Cake | Knock on Door |

As illustrated in Table 1, metadata extractor 350 tags the instance scene attributes as "home/house", "inside", and "outside""; instance character attribute in which metadata extractor 350 tags the instance character attribute for Little Red Riding Hood with "cake (action)", "knock door (sound) ", "Grandma, why are your ears so big? (dialogue)", and instance character attribute for Wolf with "in house (location)", "eating (action)", "put on clothes (action)".

Attribute identifier module 360 is configured to identify attributes of the instances for the purpose of constructing profiles for the determined characters and objects associated with the instance. Attributes may serve as elements that may be selected by user 260 on the centralized platform as textual, video, image, audio/music, or any combination thereof reflecting compact representations of characters, dialogue, sounds, situations, actions, contexts, events, locations, sentiments, etc. of the linguistic inputs and multi-media content within multi-media content repository 240 to be integrated in the multi-media content generated by user 260 via generation module 390. In some embodiments, attribute identifier module 360 generates a profile for each character detected by linguistics module 270 within the instances and assigns attributes to each character based on the analyses performed by semantics analyzer 330 and context analyzer 340, along with the metadata tagged to the attribute by metadata extractor 350. For example, in reference to the previous example linguistic input analyzed by semantics analyzer 330 and context analyzer 340, the tagging of metadata by metadata extractor 350 allows attribute identifier module 360 to generate a profile for the big wolf indicating the clothing, sequence of actions, sounds, dialogue, and any other applicable attribute for the big wolf. In some embodiments, the profiles generated by attribute identifier module 360 may be modified by user 260 via user inputs on user interfaces provided on the centralized platform during the multi-media content generation and customization process.

Machine learning module 370 is configured to use one or more heuristics and/or machine learning models for performing one or more of the various aspects as described herein (including, in various embodiments, the natural language processing or image analysis discussed herein). In some embodiments, the machine learning models may be implemented using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting, and any other applicable machine learning algorithms known to those of ordinary skill in the art. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. For example, machine learning module 370 is designed to maintain one or more machine learning models dealing with training datasets including data derived from one or more of server 210, multi-media content module 230 (e.g., multi-media content repository 240, predicted attributes, etc.), linguistics module 270, or any other applicable data source relevant to generating multi-media content. In particular, machine learning module 370 supports Generative Adversarial Networks (GANs) using deep learning methods, such as convolutional neural networks in order to process both the linguistic inputs and outputs of analyses performed by linguistics module 270. For example, machine learning module 370 may utilize a GAN mechanism to perform computer based natural language processing of one or more portions of the natural language content of the linguistic inputs. In some embodiments, linguistics module 270 is configured to determine one or more gaps within the plurality of instances, in which a gap is a missing link or component associated with the linguistic inputs and/or instance or attribute derived from the linguistic inputs. This allows for machine learning module 370 to maintain machine learning models that output predictions configured to fill the one or more gaps. For example, the aforementioned linguistic input pertaining to "Little Red Riding Hood" includes instance attributes relating to location, action, dialogue, etc.; however, a few attributes of the instances such as what type of cake, what color the clothes are, etc. are not immediately ascertainable by linguistics module 270 resulting in linguistics module 270 determining one or more gaps. Thus, machine learning module 370 utilizes one or more machine learning models designed to generate predictions based on contextual data derived from context analyzer 340, in which the predictions are attributes and/or metadata designed to fill the one or more gaps. For example, the one or more machine learning models may predict that the type of cake is a birthday cake and the color of the clothes are red based on the processing of the contextual data.

Mapping module 380 is tasked with mapping of the outputs associated with the analyses performed by linguistics module 270 on the linguistic inputs to the metadata, images, videos, animations, etc. stored in multi-media content repository 240. In particular, mapping the plurality of instances to the metadata, images, videos, animations, etc. stored in multi-media content repository 240. The mapping may be based on a plurality of factors such as, but not limited to contextual data, semantic analyses, relationships/keywords identified by linguistics module 270, generated knowledge graphs and ontology maps, treebanks, outputs of the one or more machine learning models maintained by machine learning module 370 (e.g., mapping inventories of previous outputs created by machine learning module 380), inputs of user 260 on the centralized platform, data derived from server 210, etc.

Generation module 390 is tasked with generating multi-media content subject to the customization provided by user 260 on the centralized platform being presented on computing device 250. In some embodiments, generation module 390 instructs machine learning module 370 to generate a generative adversarial network (e.g., multi-media content generator model) comprising a generator model, discriminator model, and any other applicable model for multi-media content generation, in which said models are trained utilizing supervised methods with multi-media content and metadata within multi-media content repository 240. Generation module 390 constructs core attributes of the multi-media content based on the analyses of the linguistic inputs such as location, scene, backdrop, avatars, identified topics, etc. while accounting for customized attributes subject to the preferences and privacy parameters of user 260 that may actively be provided on the centralized platform. Simultaneously the gap filling predictions generated by the one or more machine learning models that are actively being stored to multi-media content repository 240 as attributes (e.g., avatar details, sentiment ranges, scene/setting, etc.) are able to be selected by user 260 for integration into the multi-media content that generation module 390 is creating for user 260. It should be noted that generation module 390 is configured to create the multi-media content as a cohesive animation or aggregation of attributes derived from the analyses of the linguistic input and predictions, along with previews of the animations utilizing a plurality of default multi-media settings established by multi-media content module 230. In some embodiments, the previews are based on user inputs of user 260 which are matched to default multi-media settings established by multi-media content module 230, wherein multi-media settings include but are not limited to display size, resolution, color, or any other applicable multi-media settings known to those of ordinary skill in the art. Selection of multi-media settings may also be based on analyses of the linguistic inputs performed by linguistics module 270. Multi-media content module 230 supports stylistic preference options, video editing features, text element insertion tools, filtering mechanisms, etc. which are made available for selection by user 260 on the centralized platform while multi-media content module 230 actively maintains multi-media content repository 240 by continuously adding attributes and querying for additional attributes to be added based on analyses of the linguistic input (e.g., identified keywords, contextual data, ascertained metadata, etc.).

Figure 4:
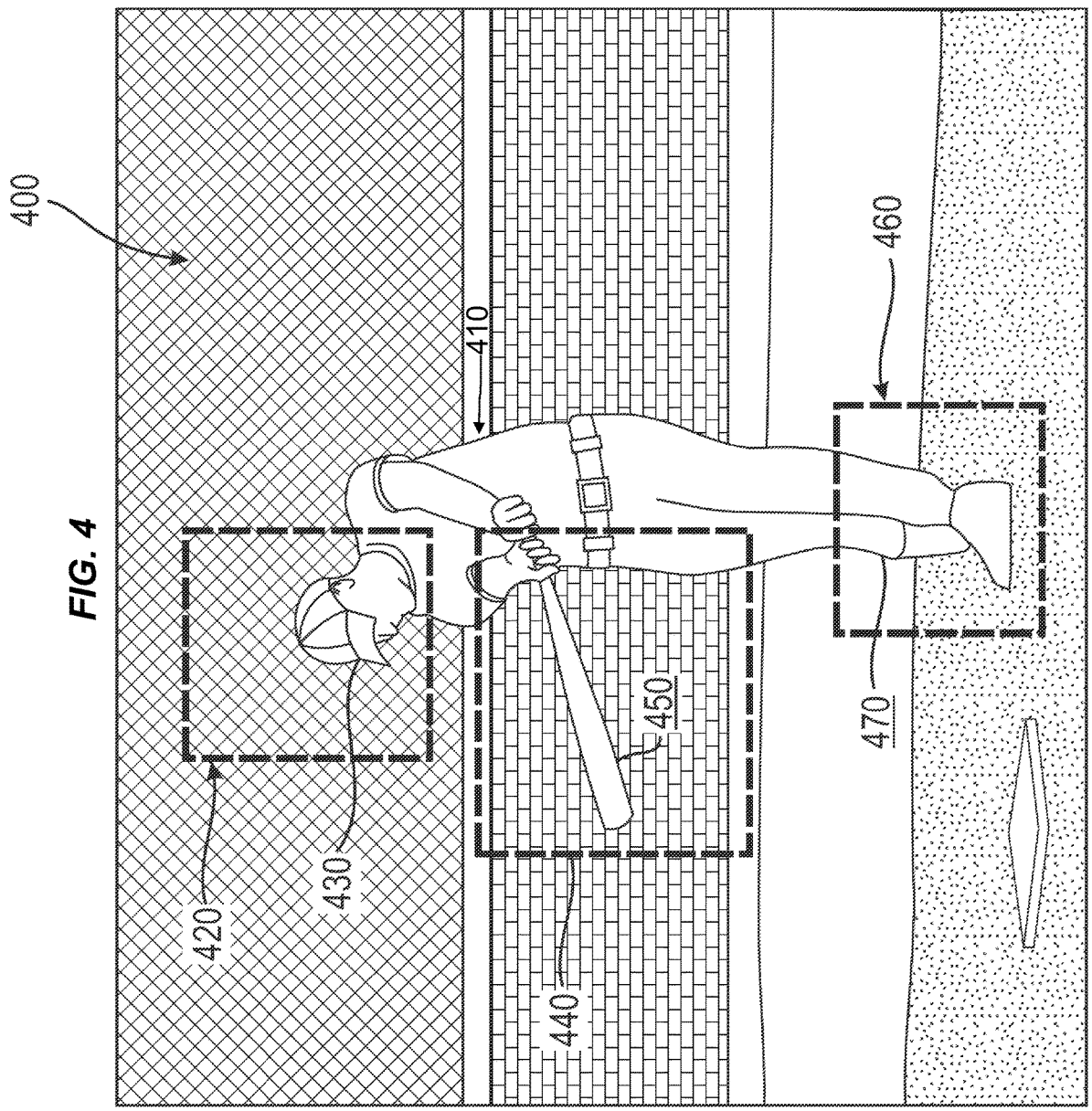
FIG. 4 illustrates an example screenshot of an analysis of an instance performed by the linguistics-based multi-media content generation system of FIG. 2, according to an exemplary embodiment.

Referring to FIG. 4, a screenshot of an instance 400 based on an analysis performed by linguistics module 270 is depicted, according to an exemplary embodiment. Instance 400 is the result of parsing performed by parser 320 on an exemplary linguistic input which is an utterance of user 260 stating "I used to play baseball wearing my favorite shoes, which would strengthen my swing with my favorite baseball bat". In some embodiments, multi-media content module 230 searches multi-media content repository 240 utilizing queries including search terms derived from identified keywords, contextual data, etc. ascertained via the analyses performed on the linguistic input by linguistics module 270 (e.g., "baseball", "memory", "pastime", "shoes", etc.). Simultaneously, machine learning module 370 is receiving the one or more gaps determined by linguistics module 270 and utilizing the one or more machine learning models to predict attributes designed to fill the one or more gaps. For example, queries including the aforementioned search terms result in multi-media content module 230 automatically and/or user 260 selecting attributes within multi-media content repository 240, in which multi-media content module 230 generates a storyline (e.g., subcomponents, segments, frames, etc.) including instances having one or more stories such as instance 400. In some embodiments, the instances include a character 410 depicted in one or more environments, each of which including a plurality of attributes selected based on the analyses performed by linguistics module 270 and/or user 260 via inputs on user interfaces provided by the centralized platform. For example, instance 400 comprises a first baseball-related background environment 420 (e.g., a batting cage, batters' box, etc.) depicting character 410 wearing a baseball hat 430, a second baseball-related background environment 440 depicting character 410 swinging a baseball bat 450, and a third baseball-related background environment 460 depicting character 410 wearing baseball cleats 470 based on the analysis of the linguistic input. It should be noted that instance 400 may comprise textual, video, audio, graphical representations, etc. in which instance 400 is configured to dynamically adjust subject to factors associated with user 260 and/or the linguistic input including but not limited to environment (e.g., air flow, temperature, humidity, etc.), smells, lighting, special effect, applicable sensory outputs, etc. Instance 400 may be a multi-media content-based animation included in one or more storylines, in which the storylines are configured to compile as the linguistic inputs are being received and analyzed. Generation module 390 is further designed to generate a preview of multi-media content-based animation (e.g., instance 400 as depicted in FIG. 4, snippets of the storylines, interactive frames of digital video content, etc.) configured to be exported and/or viewed by users on the centralized platform.

In some embodiments, instance 400 is the result of multi-media content module 230 instructing generation module 390 to generate graphical representations derived from queries of multi-media content repository 240 based on present attributes. For example, baseball related search terms are ascertained from the analyses of the linguistic inputs performed by linguistics module 270; however, attributes such as but not limited to the color, size, design, etc. of character 410, baseball hat 430, baseball bat 450, baseball cleats 470 may be ascertained by manual selection by user 260 on the centralized platform and/or generation module 390 instructs machine learning module 370 to generate a generative adversarial network (GAN) tasked with rendering three-dimensional objects matching a set of descriptive terms trained using sets of multi-media content paired with metadata associated with the attributes by mapping module 380. This GAN may be provided the attributes as the basis for generating a three-dimensional object configured to be visualized in the instances. For example, the aforementioned linguistic input analyses result in the metadata associated with the keywords, contexts, etc. of the instances and attributes, in which the outputs of machine learning models maintained by machine learning module 370 are predictions that supplement the gaps associated with instance 400 such as style and design of character 410, first baseball-related background environment 420, baseball hat 430, second baseball-related background environment 440, baseball bat 450, third baseball-related background environment 460, baseball cleats 470, etc.

Figure 5:
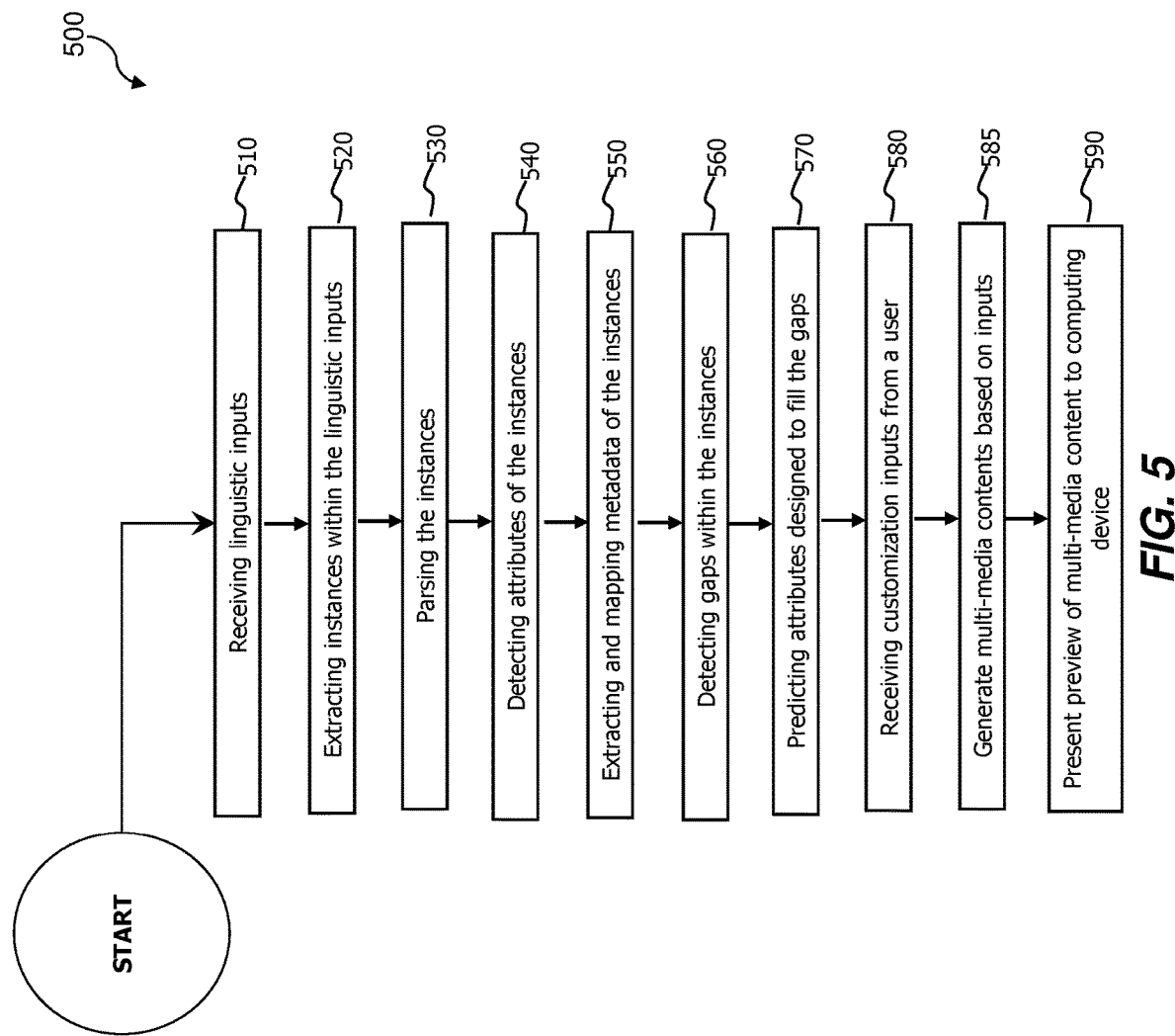
FIG. 5 illustrates an exemplary flowchart depicting a method for generating multi-media content based on linguistics, according to an exemplary embodiment.

With the foregoing overview of the example architecture, it may be helpful now to consider a high-level discussion of an example process. FIG. 5 depicts a flowchart illustrating a computer-implemented process 500 for generating multi-media content based on linguistics, consistent with an illustrative embodiment. Process 500 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At step 510 of process 500, linguistics module 270 receives the linguistic inputs. In some embodiments, linguistics module 270 utilizes microphones, cameras, computing devices, or any other applicable sensors known to those of ordinary skill in the art to acquire the linguistic inputs. In another embodiment, linguistics module 270 detects social media posts, emails, text messages, emails, spoken messages (e.g., voice notes, etc.) associated with user 260. In some embodiments, linguistics module 270 instructs machine learning module 370 to train a GAN to perform linguistic input selection based on previously trained machine learning models operated by machine learning module 370.

At step 520 of process 500, linguistics module 270 extracts instances from within the linguistic inputs. In addition to the aforementioned described details of linguistics module 270 and its components, linguistics module 270 is further configured to use natural language processing (NLP), computational linguistics, generative models, etc. to ascertain the instances from the linguistic inputs. It should be noted that instances are derivatives of linguistic inputs and/or multi-media content associated with linguistic inputs that may be embodied via video fragments, textual elements, sounds/music, linguistic features (e.g., language patterns, action verbs, tense, mood/sentiment, context, etc.). In some embodiments, data and metadata derived from the instances may be used to train machine learning models operated by machine learning module 370 in order to ascertain future instances associated with user 260. For example, a linguistic input of user 260 may refer to "Little Red Riding Hood" resulting in extraction of a first instance and generation of a first storyline by multi-media content module 230 including the character Little Red Riding Hood interacting with an object (e.g., cake). Subsequently, the second storyline following the first storyline includes a set of objects and attributes (e.g., background music, multi-media content special effects, etc.) derived from outputs of the machine learning models trained on the extractions from the first instance.

At step 530 of process 500, parser 320 performs parsing of the extracted instances. As previously mentioned, parser 320 may use corpus linguistic analysis techniques, natural language processing (NLP) techniques, term frequency-inverse document frequency (tf-idf) techniques, knowledge discovery methods, and corpus linguistic analysis techniques (e.g., syntactic analysis, etc.) to identify keywords, parts of speech, and syntactic relations within the instances; however, parser 320 may further parse feature sets such as associated context, locations, sentiments, video/image content, relationships within multi-media content repository 240, etc. The parsing also supports the detection of terms relevant to the instances which results in queries associated with the relevant terms being generated.

At step 540 of process 500, attributes of the instances are detected by linguistics module 270. Attribute identifier module 360 actively generates a profile for characters, objects, etc. detected within the instances. In some embodiments, as linguistics module 270 is identifying keywords, contexts, metadata, etc. associated with the linguistic inputs, attribute identifier module 360 is curating additional attributes and objects which allows additional attributes to be ascertained and accumulated within multi-media content repository 240. Attributes may serve as objects that may be selected by user 260 on the centralized platform as textual, video, image, color, size, location, direction, gesture, audio/music, digital inserts, environment/background context, or any combination thereof. In some embodiments, attribute identifier module 360 identifies additional attributes derived from the attributes obtained from the instance originally. For example, an instance relating to "Red Riding Hood" being parsed by parser 320 results in "grandmother" and "wolf" being ascertained, which ultimately results in attributes such as the applicable environment, background music, etc. being detected and in some instances selected by user 260 on the centralized platform.

At step 550 of process 500, metadata extractor 350 extracts metadata from the instances and mapping module 380 maps the metadata. Mapping module 380 maps the linguistic inputs and/or derivatives of the analyzed linguistic inputs to the attributes, metadata, images, videos, animations, etc., in which the mappings are configured to be stored in multi-media content repository 240. It should be noted that one of the primary purposes of the metadata is to assist with the classification, context, sentiment, overall purpose, etc. of an attribute with regards to the linguistic inputs, user 260, and the multi-media content being generated by multi-media content module 230. For example, metadata extractor 350 utilizes tagging techniques designed to indicate various features and properties of an attribute of an instance based on semantics analyzer 330 identifying the instance attribute (e.g., subject, verb, object, attributive, adverbial, complement, scene, characters, etc.) along with other applicable data acquired by linguistic module 270 such as location, sentiment, time, etc. In some embodiments, the mappings may be based on a plurality of other factors such as, but not limited to contextual data, semantic analyses, relationships/keywords identified by linguistics module 270, generated knowledge graphs and ontology maps, treebanks, outputs of the one or more machine learning models maintained by machine learning module 370 (e.g., mapping inventories of previous outputs created by mapping module 380), inputs of user 260 on the centralized platform, data derived from server 210, etc.

At step 560 of process 500, linguistics module 270 detects gaps within the instances. In some embodiments, the detection of a gap may be based upon the exceeding of an attribute threshold established by attribute identifier module 360 upon generating the profile for the applicable attribute or object. For example, if attribute identifier module 360 detects an attribute within an instance as it is creating the profiles for detected characters or objects within the instance; then, attribute identifier module 360 determines the attribute threshold associated with the instance based on components of the character/object profiles associated with the instance that are missing (e.g., missing location data, missing sentiment, missing object color/shape, etc.). Upon exceeding of the attribute threshold, linguistics module 270 determine the one or more gaps associated with the instances derived from the linguistic inputs.

At step 570 of process 500, machine learning module 370 predicts attributes designed to fill the one or more gaps. In particular, machine learning module 370 maintains one or more machine learning models trained using datasets derived from the analyses of linguistic inputs performed by linguistics module 270 (e.g., contextual data, keywords, environment, etc.), the metadata and profiles, the mappings stored in multi-media content repository 240, and/or user preferences associated with user 260 ascertained from inputs on the centralized platform.

At step 580 of process 500, server 210 receives customization inputs from user 260 via the centralized platform. In particular, the centralized platform comprises one or more user interfaces prompting user 260 for customization inputs associated with the selection and placement of characters, objects, attributes, graphical/textual representations, etc. within multi-media content generated by multi-media content module 230 along with multi-media settings utilized by generation module 390. It should be noted that the customization of generation of multi-media content includes but is not limited to display settings, sound settings, visual/audio editing filters, storyline placement, image properties of objects, color, size, location, direction, gesture, or any other applicable multi-media content generation tools, aids, or features known to those of ordinary skill in the art.

At step 585 of process 500, generation module 390 generates the multi-media content based on the customization inputs. The customization inputs may be used as a base reference point for multi-media content and the remainder of applicable components necessary to generate the multi-media content may be provided by machine learning module 370 based on default multi-media content generation settings, previously generated multi-media content, etc. In some embodiments, the multi-media content is customizable multi-media content designed to reflect one or more available customizing features of the centralized platform such as, but not limited visual effects, audio effects, and any other applicable multi-media content based customization features known to those of ordinary skill in the art.

At step 590 of process 500, a preview of the generated multi-media content is presented to computing device 250. It should be noted that the preview is configured to be shared among users on the centralized platform in which the preview is an animated subset of the multi-media content and/or storyline designed to be interactive with users. For example, if user 260 exports and transmits the preview to another user operating on the centralized platform then the receiving user may highlight an interactive frame including the preview which triggers one or more responses including but not limited to textual data associated with storyline displayed, looping of the animation, etc.

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-payment devices or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter payment device or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalent.

What is claimed is:

1. A computer-implemented method for generating multimedia content based on linguistics, the method comprising:
    analyzing, by a computing device, a plurality of linguistic inputs to identify a plurality of attributes derived from a plurality of instances associated with the plurality of linguistic inputs;
    identifying, by the computing device, at least one character derived from the plurality of instances;
    generating, by the computing device, a profile for the at least one character and assigning the plurality of attributes to the at least one character based on a plurality of metadata tagged to the plurality of attributes;
    wherein generating the profile comprises determining, by the computing device, one or more gaps within the plurality of instances based upon an attribute threshold being exceeded; and
    generating, by the computing device, a shared interactive preview for presentation to a user comprising the one or more gaps filled by one or more predicted attributes derived from a machine learning model based on the plurality of metadata.

2. The computer-implemented method of claim 1, wherein analyzing the plurality of linguistic inputs comprises:

parsing, by the computing device, the plurality of instances of the plurality of linguistic inputs;

extracting, by the computing device, a plurality of metadata from the plurality of instances; and mapping, by the computing device, the plurality of metadata to a plurality of attributes of the plurality of instances based on a plurality of contextual information.

3. The computer-implemented method of claim 2, wherein parsing the plurality of instances comprises:

determining, by the computing device, one or more gaps associated with the plurality instances; and predicting, by the computing device, one or more attributes of the plurality of attributes utilizing at least a machine learning model;

wherein the one or more predicted attributes are designed to fill the one or more gaps.

4. The computer-implemented method of claim 2, wherein the plurality of instances comprises one or more of video fragments, textual elements, and linguistic features of the plurality of linguistic inputs.

5. The computer-implemented method of claim 1, wherein generating the shared interactive preview comprises:

receiving, by the computing device, a plurality of user inputs from the user configured to customize the generation of the multi-media content.

6. The computer-implemented method of claim 5, wherein generating the shared interactive preview comprises:

generating, by the computing device, the shared interactive preview of the multi-media content utilizing a plurality of default multi-media settings;

wherein the preview is based on the plurality of user inputs being matched to the plurality of default multi-media settings.

7. The computer-implemented method of claim 1, wherein receiving the plurality of linguistic inputs comprises:

maintaining, by the computing device, a repository of the multi-media content configured to comprise animations, images, textual analyses, and metadata.

8. A computer program product for generating multi-media content based on linguistics, the computer program product comprising a computer readable storage medium having program instructions embodied therewith, wherein the computer readable storage medium is not a transitory signal per se, the program instructions being executable by a processor to cause the processor to perform a method comprising:

analyzing a plurality of linguistic inputs to identify a plurality of attributes derived from a plurality of instances associated with the plurality of linguistic inputs;

identifying at least one character derived from the plurality of instances;

generating a profile for the at least one character and assigning the plurality of attributes to the at least one character based on a plurality of metadata tagged to the plurality of attributes;

wherein generating the profile comprises determining one or more gaps within the plurality of instances based upon an attribute threshold being exceeded; and generating a shared interactive preview for presentation to a user comprising the one or more gaps filled by one or more predicted attributes derived from a machine learning model based on the plurality of metadata.

9. The computer program product of claim 8, wherein analyzing the plurality of linguistic inputs comprises:

parsing the plurality of instances of the plurality of linguistic inputs;

extracting a plurality of metadata from the plurality of instances; and mapping the plurality of metadata to a plurality of attributes of the plurality of instances based on a plurality of contextual information.

10. The computer program product of claim 9, wherein parsing the plurality of instances comprises:

determining one or more gaps associated with the plurality instances; and predicting one or more attributes of the plurality of attributes utilizing at least a machine learning model;

wherein the one or more predicted attributes are designed to fill the one or more gaps.

11. The computer program product of claim 9, wherein the plurality of instances comprises one or more of video fragments, textual elements, and linguistic features of the plurality of linguistic inputs.

12. The computer program product of claim 9, wherein receiving the plurality of linguistic inputs comprises:

maintaining a repository of the multi-media content configured to comprise animations, images, textual analyses, and metadata.

13. The computer program product of claim 8, wherein generating the shared interactive preview comprises:

receiving a plurality of user inputs from the user configured to customize the generation of the multi-media content.

14. The computer program product of claim 13, wherein generating multi-media content comprises:

generating, by the computing device, the shared interactive preview of the multi-media content utilizing a plurality of default multi-media settings;

wherein the preview is based on the plurality of user inputs being matched to the plurality of default multi-media settings.

15. A computer system for generating multi-media content based on linguistics, the computer system comprising:

one or more processors;

one or more computer-readable memories;

program instructions stored on at least one of the one or more computer-readable memories for execution by at least one of the one or more processors, the program instructions comprising:

program instructions to analyze a plurality of linguistic inputs to identify a plurality of attributes derived from a plurality of instances associated with the plurality of linguistic inputs;

program instructions to identify at least one character derived from the plurality of instances;

program instructions to generate a profile for the at least one character and assign the plurality of attributes to the at least one character based on a plurality of metadata tagged to the plurality of attributes;

wherein program instructions to generate the profile comprise program instructions to determine one or more gaps within the plurality of instances based upon an attribute threshold being exceeded; and program instructions to generate a shared interactive preview for presentation to a user comprising the one or more gaps filled by one or more predicted attributes derived from a machine learning model based on the plurality of metadata.

16. The computer system of claim 15, wherein program instructions to analyze the plurality of linguistic inputs comprise:
- program instructions to parse a plurality of instances of the plurality of linguistic inputs;
- extracting, by the computing device, a plurality of metadata from the plurality of instances; and
- program instructions to map the plurality of metadata to a plurality of attributes of the plurality of instances based on a plurality of contextual information.

17. The computer system of claim 16, wherein program instructions to parse the plurality of instances comprise:
- program instructions to determine one or more gaps associated with the plurality instances; and
- program instructions to predict one or more attributes of the plurality of attributes utilizing at least a machine learning model;
- wherein the one or more predicted attributes are designed to fill the one or more gaps.

18. The computer system of claim 15, wherein program instructions to generate the shared interactive preview comprise:
- program instructions to receive a plurality of user inputs from the user configured to customize the generation of the multi-media content.

19. The computer system of claim 18, wherein program instructions to generate the shared interactive preview comprise:
- program instructions to generate the shared interactive preview of the multi-media content utilizing a plurality of default multi-media settings;
- wherein the preview is based on the plurality of user inputs being matched to the plurality of default multi-media settings.

20. The computer system of claim 15, program instructions to receive the plurality of linguistic inputs comprise:
- program instructions to maintain a repository of the multi-media content configured to comprise animations, images, textual analyses, and metadata.

* * * * *